United States Patent

Kinoshita et al.

[11] Patent Number: 5,135,085
[45] Date of Patent: Aug. 4, 1992

[54] LUBRICATING DEVICE FOR ONE-WAY CLUTCH

[75] Inventors: Yoshio Kinoshita, Ayase; Norio Komatsubara; Kazuhiro Yagi, both of Fujisawa, all of Japan

[73] Assignee: NSK-Warner K.K., Tokyo, Japan

[21] Appl. No.: 660,860

[22] Filed: Feb. 26, 1991

[30] Foreign Application Priority Data

Mar. 1, 1990 [JP] Japan .................. 2-19476[U]

[51] Int. Cl.⁵ .................. F16D 41/07; F16D 13/74
[52] U.S. Cl. .................. 192/41 R; 192/113 B
[58] Field of Search .................. 192/113 B, 45, 45.1, 192/41 R; 384/465, 466, 470, 474

[56] References Cited

U.S. PATENT DOCUMENTS

| | | | |
|---|---|---|---|
| 3,175,661 | 3/1965 | Maurer et al. | 192/113 B X |
| 3,247,935 | 4/1966 | Marland | 192/113 B X |
| 4,400,040 | 8/1983 | Toth et al. | 384/465 |
| 4,874,069 | 10/1989 | Lederman | 192/113 B X |
| 4,953,353 | 9/1990 | Lederman | 192/45 X |

FOREIGN PATENT DOCUMENTS 1303816  1/1973  United Kingdom ............ 192/113 B

Primary Examiner—Rodney H. Bonck
Attorney, Agent, or Firm—Shapiro and Shapiro

[57] ABSTRACT

A one-way clutch incorporates an arrangement to lead lubricating oil to the torque transmitting members without the use of a penetrating hole in the inner ring or outer ring of the clutch. Instead, a guide arrangement is provided externally of the track surfaces of the inner and outer rings for leading the lubricating oil from outside the one-way clutch to the torque transmitting members, e.g. rollers or sprags. In a clutch having a centering block for supporting the inner and outer rings, the guide arrangement may lead the lubricating oil into the centering block.

12 Claims, 13 Drawing Sheets

LUBRICATING DEVICE FOR ONE-WAY CLUTCH

BACKGROUND OF THE INVENTION

1. Field of the Invention

This invention relates to a one-way clutch used for torque transmission, back stop or overrunning in an automatic variable speed device to be used for an automobile etc., and more particularly to a lubricating device for leading lubricating oil into the inside of a one-way clutch having clutch members such as sprags or rollers.

2. Related Background Art

In a one-way clutch effective to transmit rotary power in one direction only and free running in another direction, clutch members such as sprags or rollers are disposed between inner and outer rings and both end surfaces of the clutch members are guided by side plates. The clutch members engage with the inner and outer rings when the rotary power is transmitted and slip therebetween during free running.

Such a conventional one-way clutch is shown in FIGS. 27 to 32. FIG. 27 shows a one-way clutch where lubricating oil is supplied to clutch members from the inner ring side, FIG. 28 shows the assembly of the one-way clutch, FIG. 29 shows a longitudinal cross section of FIG. 28, and FIG. 30 shows details of the roller arrangement. FIG. 31 shows a one-way clutch where lubricating oil is supplied to clutch members from the outer ring, and FIG. 32 shows an application of a one-way clutch.

In FIG. 27, a conventional one-way clutch 1, where lubricating oil is supplied from inner ring to clutch members, comprises inner ring 2 and outer ring 3, and rollers 4 are disposed between the inner and outer rings. At the inner peripheral surface of outer ring 3, a cam surface 3a is formed in association with each roller 4 to constitute cam structure 5 together with the roller 4 so that the inner ring 2 can rotate relative to outer ring 3 only in one direction. At one side surface of outer ring 3, a step 3b is formed, to which a first side plate 6 fits to effect centering of the first side plate 6. The first side plate 6 covers first end surfaces of rollers 4 and parts of the first side plate 6 are folded to form folded pieces 6a, which penetrate between inner ring 2 and outer ring 3. The front end 6b of each piece 6a projects from the other side of the outer ring. At the other side surface of outer ring 3 a second side plate 7 is provided which covers the other end surfaces of rollers 4. The second side plate 7 has small holes 7a through which folded pieces 6a of the first side plate 6 project, and the front end 6b of each piece 6a is caulked at the outer surface of the second side plate 7 so as to effect centering of the second side plate 7 and to fix both side plates 6 and 7 to outer ring 3. Inner ring 2 has a groove 2a at its inner peripheral surface and lubricating oil filled in groove 2a is supplied to rollers 4 through a lubricating oil hole 2b by centrifugal force.

As shown in FIGS. 28 and 30, centering blocks (pad bearings) 8 are provided between outer ring 3 and inner ring 2. Each centering block 8 comprises a slide part 8a, which slidingly contacts inner ring 2, folded parts 8b engaging with a recess 3c formed at the inner peripheral surface of outer ring 3 and supported by folded pieces 6a, and supporting parts 8c connecting slide part 8a and folding parts 8b. Folding parts 8b of centering block 8 are supported by folded pieces 6a so as to be fixed to recess 3c of outer ring 3.

FIG. 31 shows a conventional one-way clutch 9 where lubricating oil is supplied to the clutch members from outer ring side, with parts corresponding to those in one-way clutch 1 being assigned the same reference numbers. The difference from the one-way clutch where lubricating oil is supplied from inner ring is that instead of the hole 2b and the groove 2a of inner ring 2, a lubricating hole 3c is provided in outer ring 3, and the lubricating oil is supplied through the hole 3c to rollers 4.

The application of one-way clutch 1 is shown in FIG. 32, in which inner ring 2 is welded to a plate 100. In one-way clutches 1, 9, since rollers 4 slide during free running, heating and friction become large unless sufficient lubrication is provided.

The use of a lubricating hole 2c or 3c as previously described leads to a number of practical problems. For example, the presence of the hole leads to stress concentration which can cause damage and reduce the service life of the clutch. Peeling off or scratching of the edge of the hole can occur when the clutch is engaged with the hole being subjected to heavy surface pressure by a clutch member. Although the clutch structure may be reinforced by increasing the thicknesses of the inner and outer rings, this causes the clutch to become undesirably heavy and bulky. As still another problem, the forming of the aforementioned lubricating hole requires a complex and expensive operation.

SUMMARY OF THE INVENTION

Basically speaking, the present invention overcomes such problems of the conventional one-way clutches through the use of a novel arrangement in which lubricating oil is guided to the clutch members without the use of a lubricating hole in one of the inner and outer race track surfaces.

For example, in a first preferred form, a one-way clutch according to the present invention includes a centering block having a sliding portion sliding on the track surface of one of the inner and outer clutch rings and a pair of spaced radially extending supporting portions, a side plate attached to one of the inner and outer rings and covering corresponding end surfaces of the clutch members, the side plate having a hole therethrough in alignment with a space between the supporting portions of the centering block, and means for introducing lubricating oil into said space through the hole of the side plate.

In another preferred form of the invention, a side plate of a one-way clutch is provided with means including an axially outwardly protruding inner peripheral portion of the side plate for catching lubricating oil flowing outwardly in a radial direction under centrifugal force and for directing the lubricating oil between the track surfaces of the inner and outer clutch rings.

In still another preferred form of the invention, a one-way clutch is provided with a side plate having at least one axially outwardly protruded and radially inwardly open embossment for catching lubricating oil flowing outwardly in a radial direction under centrifugal force and for directing the oil between the track surfaces of the inner and outer clutch rings.

In yet another preferred form of the invention, a one-way clutch is provided with a side plate having a hole therethrough in communication with a space between the track surfaces of the inner and outer clutch rings. An oil catcher is attached to the side plate and has a wall extending circumferentially of the side plate and outwardly along an axis of the side plate to define an oil catchment space for catching lubricating oil flowing outwardly in a radial direction under centrifugal force and to guide the lubricating oil into the hole of the side plate.

The above and other preferred forms of the invention, and additional features and advantages thereof are more fully explained in the detailed description hereinafter.

DESCRIPTION OF THE PREFERRED EMBODIMENTS

Figure 1:
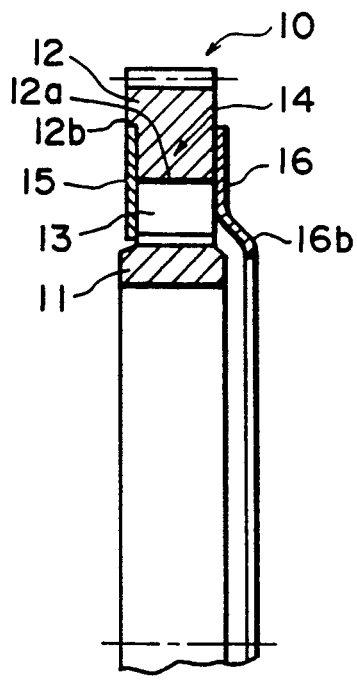
FIG. 1 is an enlarged fragmentary cross-sectional view of a first embodiment of a one-way clutch of this invention, where lubricating oil is supplied to clutch members from the inner ring side.
Figure 2:
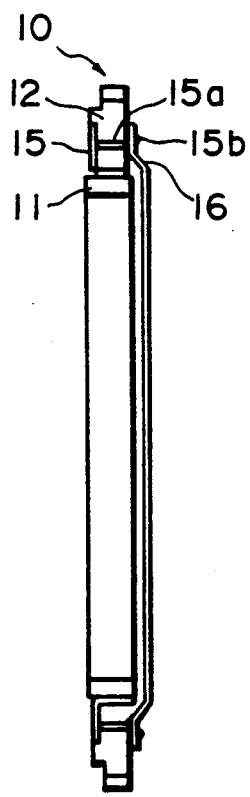
FIG. 2 is a cross-sectional view of the one-way clutch according to the first embodiment.
Figure 3:
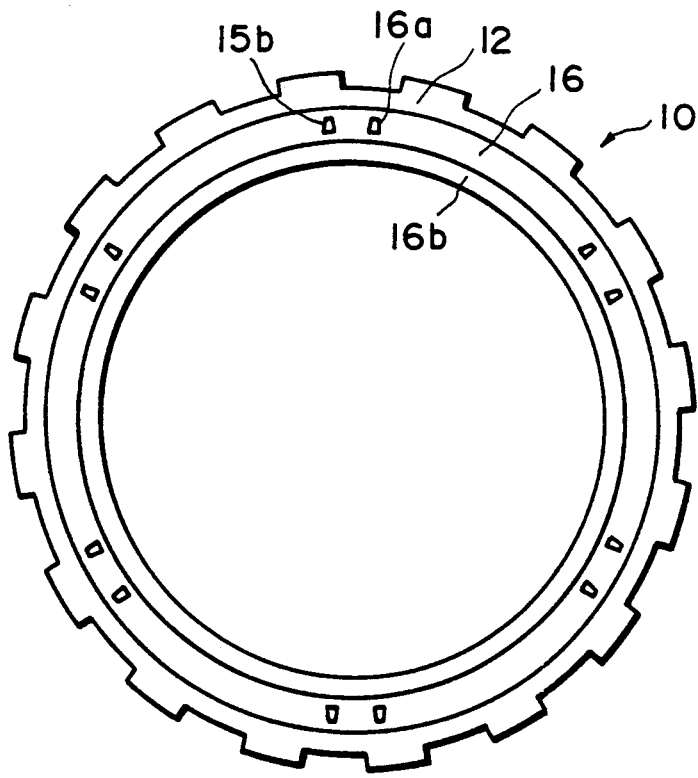
FIG. 3 is a front view of the one-way clutch of the first embodiment.

FIGS. 1 to 3 show a first embodiment of the invention, in which a one-way clutch 10 has lubricating oil supplied to the clutch members from the inner ring side.

In FIG. 1, one-way clutch 10 comprises inner ring 11 and outer ring 12, and rollers 13 disposed between the inner and outer rings. A cam surface 12a is formed at the inner peripheral surface of outer ring 12 for each roller 13. Each cam surface 12a and associated roller 13 form a cam structure 14, so that inner ring 11 can rotate in only one direction relative to outer ring 12.

At one side surface of outer ring 12, a step 12b is formed, and a first side plate 15 is mounted on step 12b, thus centering side plate 15. Side plate 15 covers first end surfaces of rollers 13, and parts of the plate 15 are folded to form folded portions which penetrate between inner ring 11 and outer ring 12. A front end portion 15b of each folded portion 15a projects out past the other side of outer ring 12. At the other side of outer ring 12, a second side plate 16, which covers the other end surfaces of rollers 13, is provided. Second side plate 16 has holes 16a through which folded portions 15a project, and each front end portion 15b is caulked at the surface of side plate 16 so as to center second side plate 16 and fix both side plates 15 and 16 to outer ring 12. As best seen in FIG. 1, the inner peripheral end portion of second side plate 16 projects outwardly along the rotating axis (horizontal in FIG. 1) of one-way clutch 10 to form a bulging portion 16b. Thus, a lubricating oil path is formed such that lubricating oil flowing outwardly in a radial direction by centrifugal force is received by bulging portion 16b and supplied to rollers 13.

Figure 4:
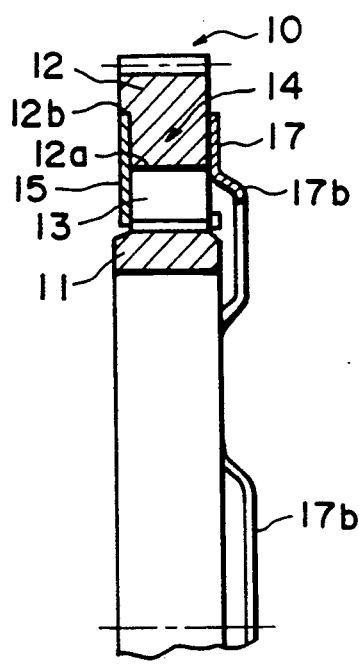
FIG. 4 is an enlarged fragmentary cross-sectional view of a second embodiment of this invention.
Figure 5:
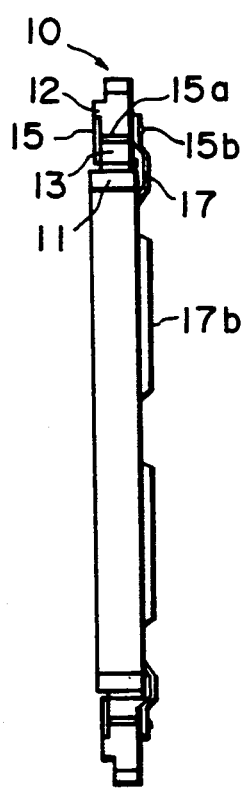
FIG. 5 is a cross-sectional view of the second embodiment.
Figure 6:
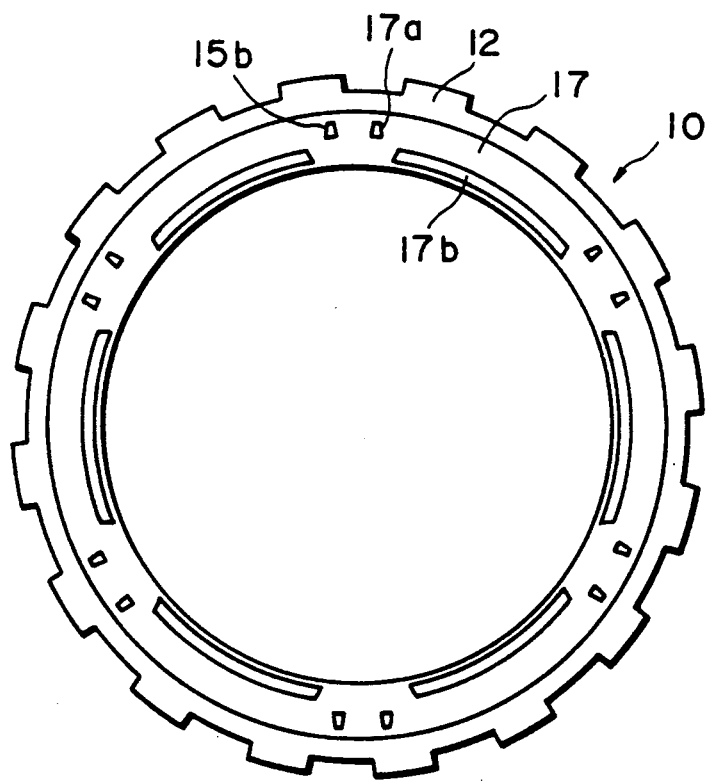
FIG. 6 is a front view of the second embodiment.
Figure 7:
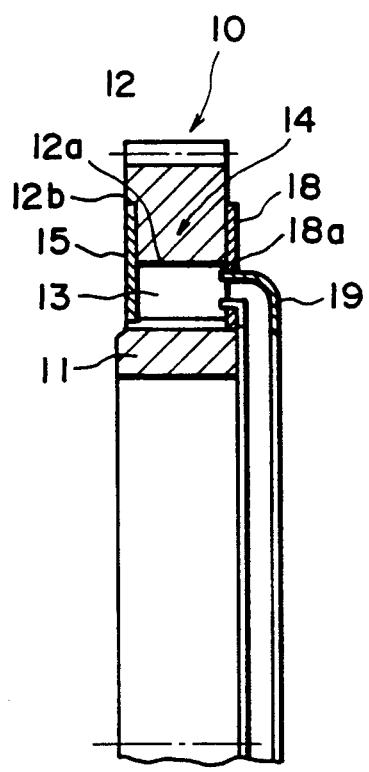
FIG. 7 is an enlarged fragmentary cross-sectional view of a third embodiment.
Figure 8:
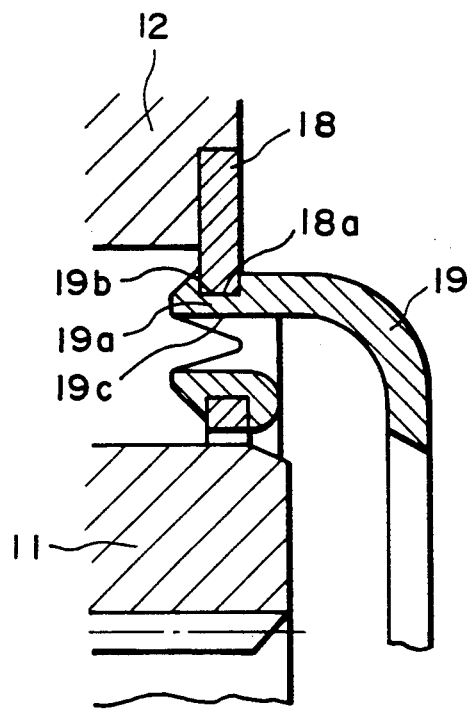
FIG. 8 is a cross-sectional view showing a second side plate and oil catcher of the third embodiment in more detail.

FIGS. 4 to 6 show a second embodiment, in which a second side plate 17 has bulging portions arranged at circumferential intervals, taking the strength of second side plate and action of one-way clutch 10 into consideration. Other portions are similar to the first embodiment.

As will be appreciated from FIGS. 4 and 5, plural portions of the inner peripheral edge of second side plate 17 are press worked to project outwardly along the rotating axis of one-way clutch 10 to form bulging portions 17b. Consequently, as in the first embodiment, due to centrifugal force, the lubricating oil flowing outwardly in the radial direction is received by bulging portions 17b to supply the oil to rollers 13.

FIGS. 7 to 10 show a third embodiment. Instead of providing bulging portions on the second side plate, an oil catcher 19 for receiving lubricating oil is provided in the third embodiment. There is no difference in the elements other than second side plate and catcher from the second embodiment.

Figure 9:
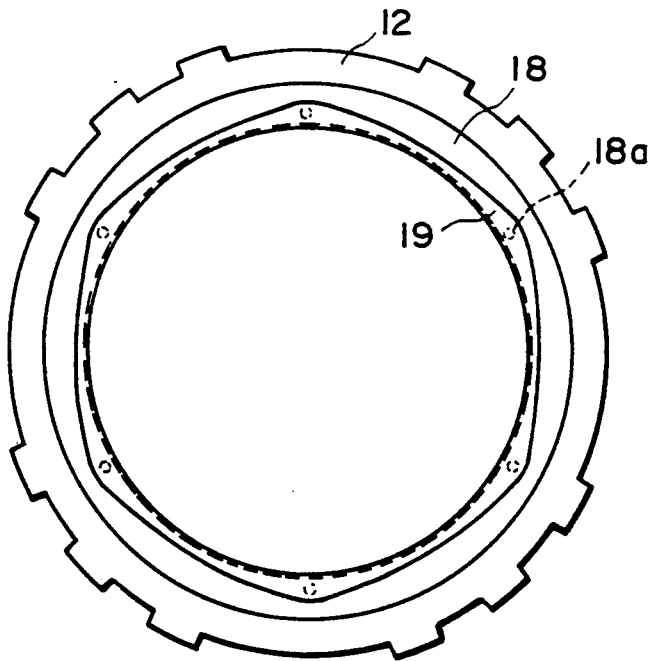
FIG. 9 is a front view of the one-way clutch of the third embodiment.
Figure 10:
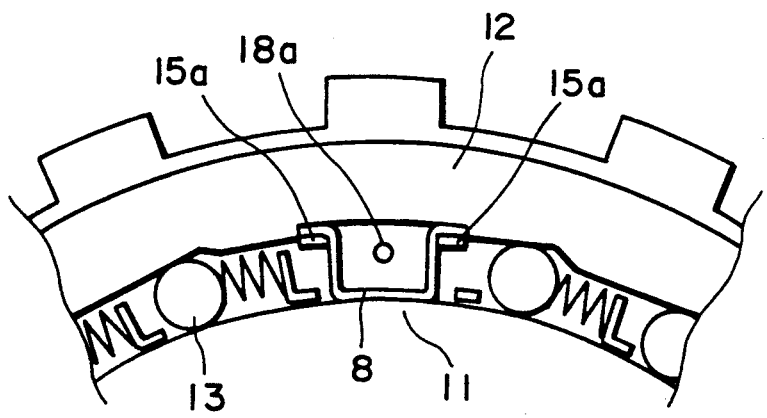
FIG. 10 shows details in the region of a centering block.

In a second side plate 18, as shown in FIG. 9, six penetrating holes 18a are equiangularly spaced to penetrate from one side to the other side of the second side plate. As shown in FIG. 10, such a penetrating hole 18a communicates with the inside of a centering block 8. Fitted to this hole 18a, is an outer peripheral groove 19b provided on a tubular projection 19a of oil catcher 19, so as to fix oil catcher 19 to second side plate 18. Oil catcher 19 is made of elastic material such as plastic, and it is possible to push projection 19a into penetrating hole 18a. Oil catcher 19 projects outwardly along the rotating axis of one-way clutch 10. The inner peripheral portion of oil catcher 19 is circular and the outer peripheral portion is of substantially hexagon shape with the apexes positioned at holes 18a. Between oil catcher 19 and second side plate 18, a lubricating oil path is formed, which communicates with the inside of centering block 8 in one-way clutch 10 through penetrating hole 19c of projections 19a.

According to the above structure, lubricating oil flowing outwardly in the radial direction by centrifugal force is received by oil catcher 19 and the oil is collected at the tubular projection 19a at the apex of hexagon shaped oil catcher 19, so that the oil is supplied to the inside of centering block 8 through penetrating hole 19c.

Figure 11:
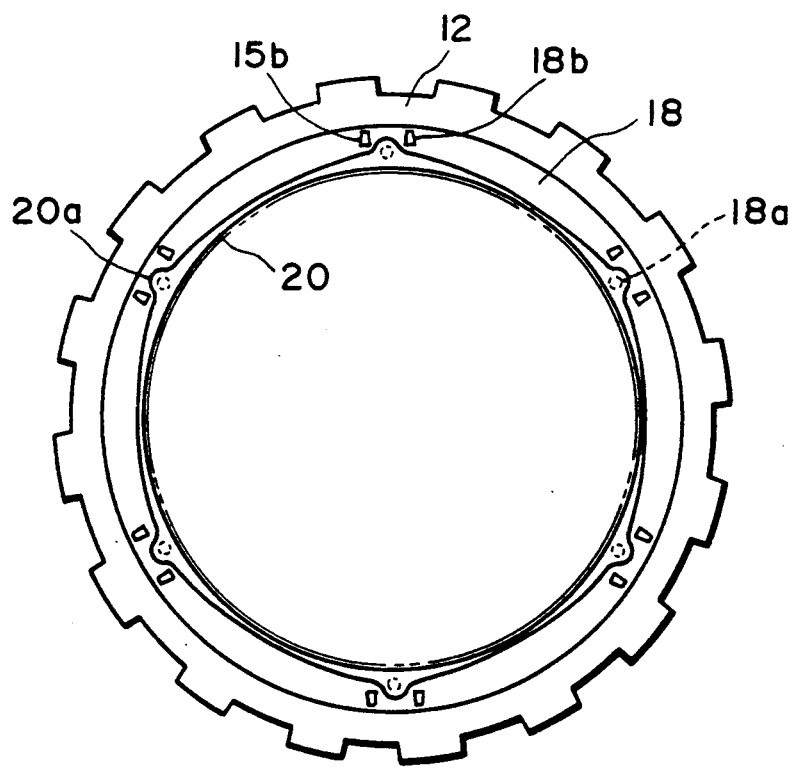
FIG. 11 is a front view of a modification of the third embodiment.

In this embodiment, oil catcher 19 is mounted on second side plate 18, but it is possible to mount oil catcher 19 on first side plate 15. Further, as shown in FIG. 11, for reducing the possibility of chipping the ends 15b of folded portions 15a of first side plate 15, the outer periphery of the oil catcher, designated 20 in this modification, made substantially circular, so that only tubular projections 20a project outwardly in the radial direction.

Figure 12:
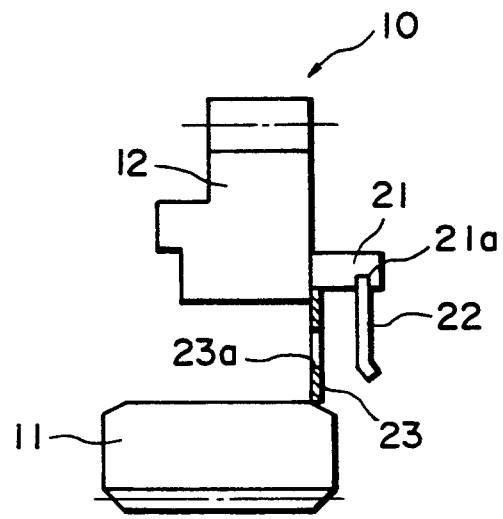
FIG. 12 is a detailed view showing a stop ring mounted on an outer ring.

FIG. 12 shows an embodiment in which a projection 21 is provided along the whole periphery of outer ring 12 of one-way clutch 10, extending outwardly along the rotating axis of clutch 10. A key groove 21a is formed on projection 21, and an annular stop ring 22 fits in this groove 21a to form a trough, which receives lubricating oil flowing outwardly in the radial direction. The oil is supplied to the inside of the clutch 10 through penetrating hole 23a of a second side plate 23.

Figures 13A, 13B:
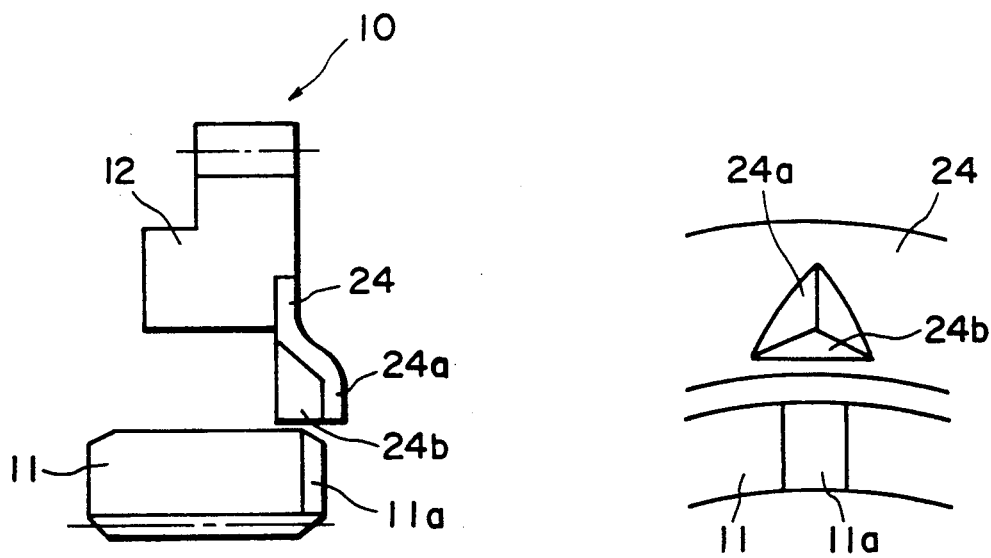
FIGS. 13A and 13B are cross-sectional and front views, respectively, showing a triangle shape member provided on a side plate.

Referring to FIG. 13, substantially triangular shaped embossments 24a may be equiangularly spaced on a second side plate 24, and through substantially triangular apertures 24b formed at embossments 24a lubricating oil is supplied to one-way clutch 10. Further, a groove 11a extending radially outwardly can be provided on one side of inner ring 11 at a position corresponding to embossment 24a so as to make lubricating oil flow into aperture 24b more smoothly.

Figure 14:
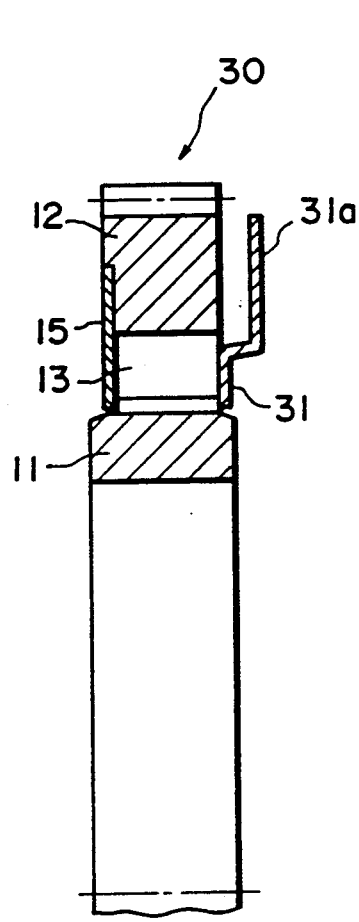
FIG. 14 is an enlarged fragmentary cross-sectional view of a fourth embodiment of the one-way clutch, where lubricating oil is supplied to clutch members from the outer ring side.

Explanation will now be made of an embodiment where lubricating oil is supplied to a one-way clutch 30 from the outer ring side. FIG. 14 shows a fourth embodiment, which differs from the first embodiment in the structure of the second side plate. The second side plate 31 has a bulging portion 31a projected outwardly along the rotating axis of one-way clutch 30. Consequently, lubricating oil supplied from an unillustrated external device is received by bulging portion 31a of second side plate 31 to supply the lubricating oil to rollers 13.

Figure 15:
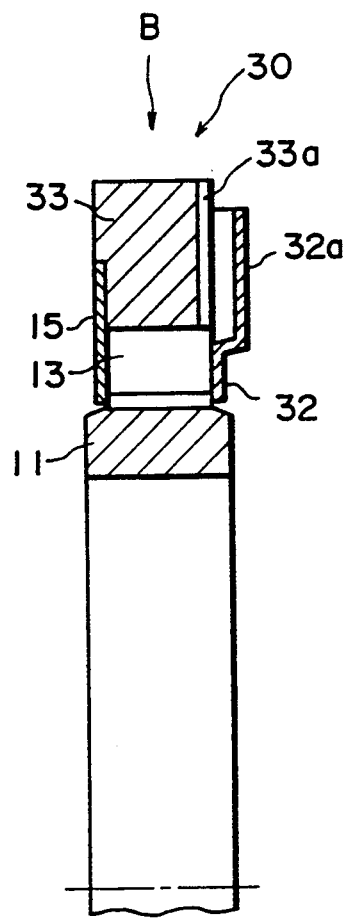
FIG. 15 is an enlarged fragmentary cross-sectional view of a fifth embodiment.
Figure 16:
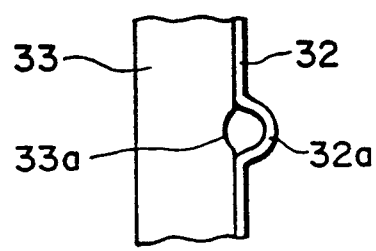
FIG. 16 is an enlarged fragmentary plan view as seen in arrow direction B of FIG. 15.

FIGS. 15 and 16 show a fifth embodiment, which is similar to the fourth embodiment, but with a different second side plate and outer ring. Plural portions at the outer periphery of second side plate 32 are projected outwardly along the rotating axis of one-way clutch 30 to form bulging portions 32a. In an outer ring 33, a groove 33a extending radially from outer periphery to inner periphery is provided at a position corresponding to bulging portion 32a. FIG. 16 shows one-way clutch 30 seen in the arrow direction B in FIG. 15. With the provision of groove 33a, lubricating oil coming from the lubricating path provided from an unillustrated external device is received more smoothly at the bulging portion 32a and efficiently supplied to rollers 13.

Figure 17:
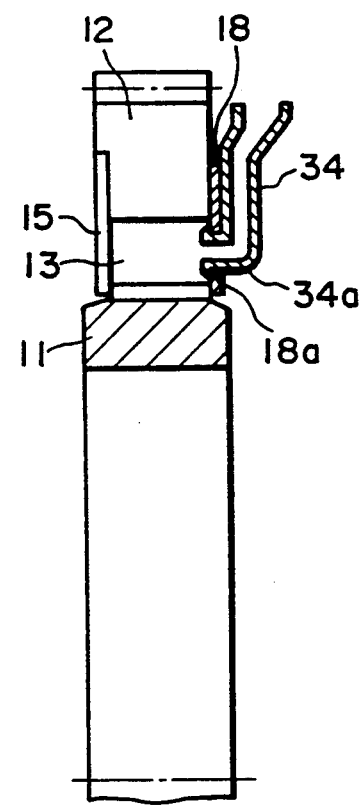
FIG. 17 is an enlarged fragmentary cross-sectional view of the second side plate and oil catcher of a sixth embodiment.

FIG. 17 shows a sixth embodiment of the invention, in which, instead of providing the bulging portion at the second side plate, an oil catcher is mounted for receiving lubricating oil. The sixth embodiment differs from the third embodiment in that the oil catcher opens outwardly in the radial direction. As in the third embodiment, second side plate 18 has penetrating holes 18a penetrating from one side to the other side in the manner shown in FIG. 17. To each penetrating hole 18a a tubular projection 34a of oil catcher 34 fits, whereby oil catcher 34 is fixed to second side plate 18. Lubricating oil flowing from an unillustrated external device is received by the oil catcher and supplied to rollers 13 through holes 18a.

Figure 18:
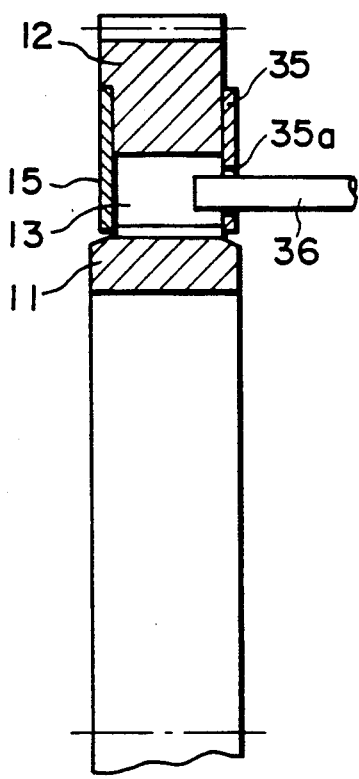
FIGS. 18 and 19 are enlarged fragmentary cross-sectional views of one-way clutches providing a pipe.
Figure 19:
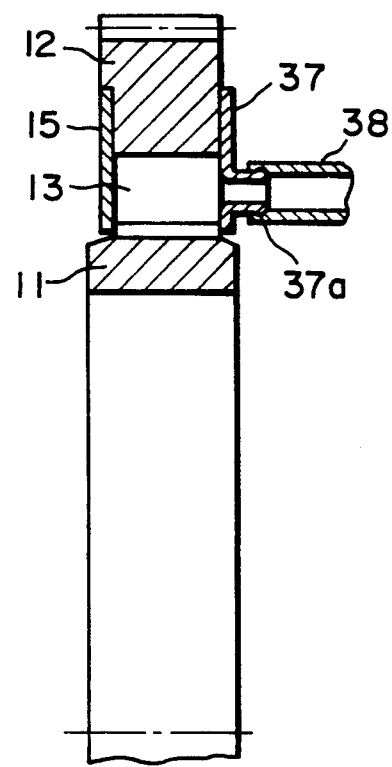

According to the invention as shown in FIGS. 18 and 19, a pipe communicating with the one-way clutch can be provided to supply lubricating oil to rollers 13. In FIG. 18, a second side plate 35 provides a penetrating hole 35a to which a pipe 36 fits so that lubricating oil coming from an unillustrated external device can be supplied to rollers 13 through pipe 36. Further as shown in FIG. 19, an externally projecting tubular projection 37a may be provided on a second side plate 37, and a pipe 38 may be mounted to projection 37a so that lubricating oil coming from the unillustrated external device is supplied to rollers 13 through pipe 38.

Figure 21:
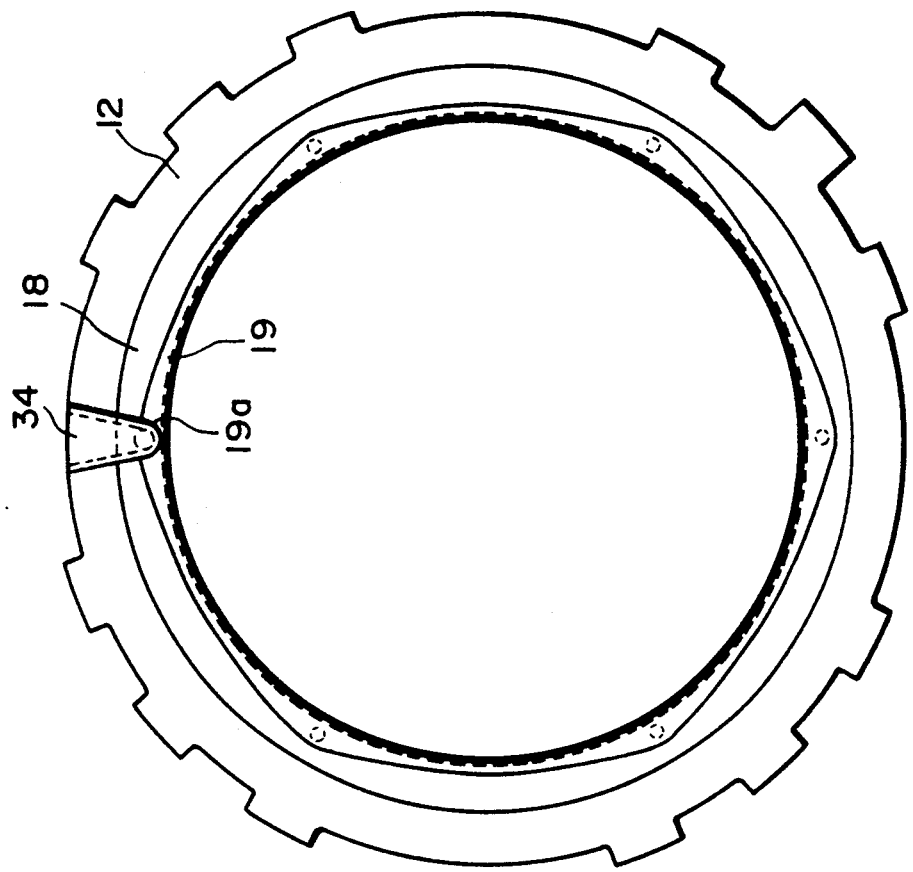
FIG. 20 to FIG. 23 show an embodiment where two oil catchers are provided for supplying lubricating oil from the outer ring and inner ring, respectively.
Figure 20:
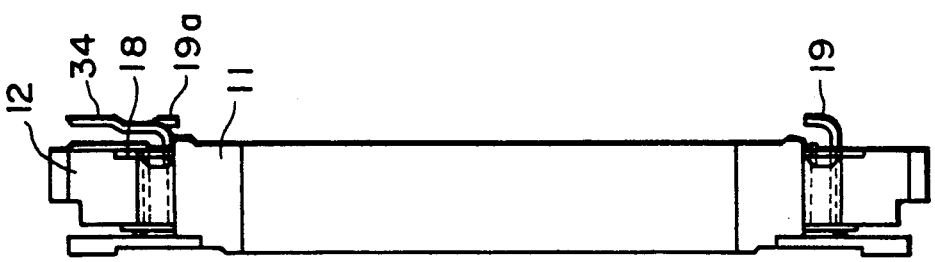
Figure 23:
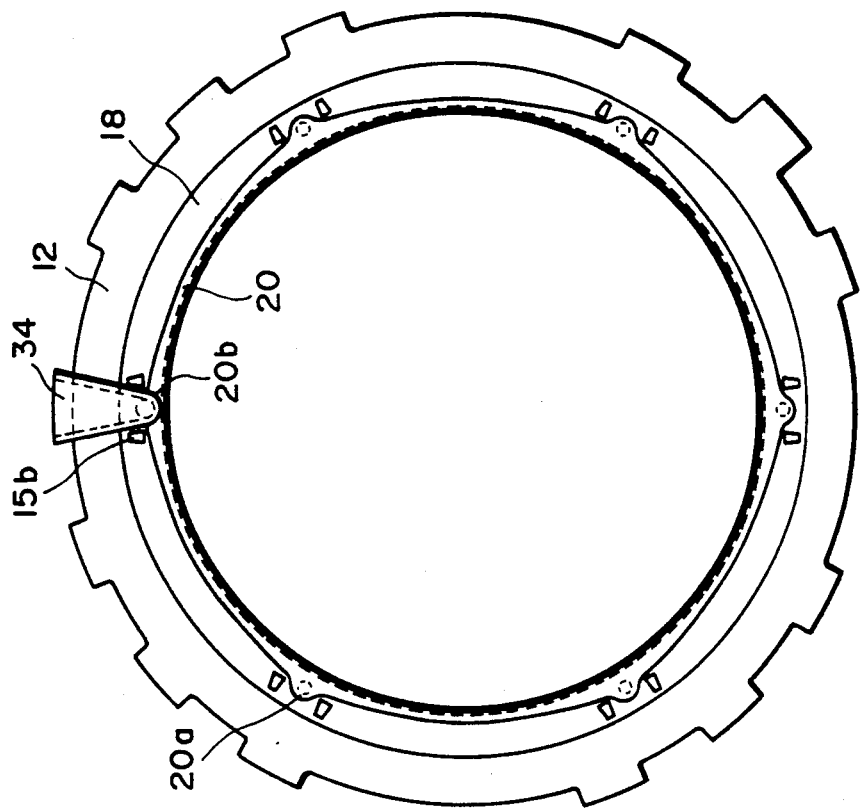
Figure 22:
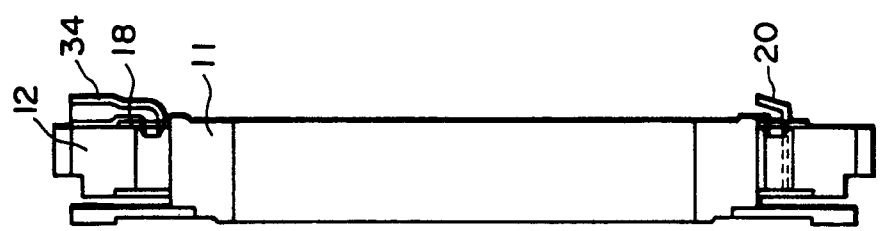

FIGS. 20 to 23 show arrangements in which lubricating oil is provided from the outer and inner ring sides, in substantially a combination of the third and sixth embodiments. As shown in FIGS. 20 and 21, a notch 19a is provided at the portion of oil catcher 19 receiving lubricating oil flowing by centrifugal force An oil catcher 34 receiving lubricating oil is mounted on notch 19a. FIGS. 22 and 23 show similar structure in which oil catchers 20 and 34 are provided.

Figure 24:
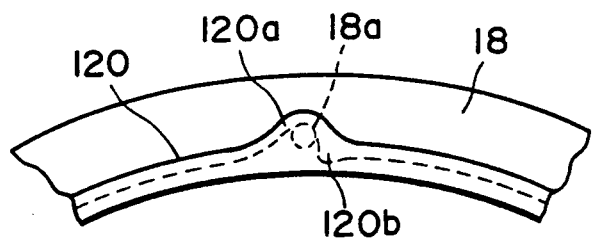
FIG. 24 shows a modification of an oil catcher shown in the third embodiment.
Figure 25:
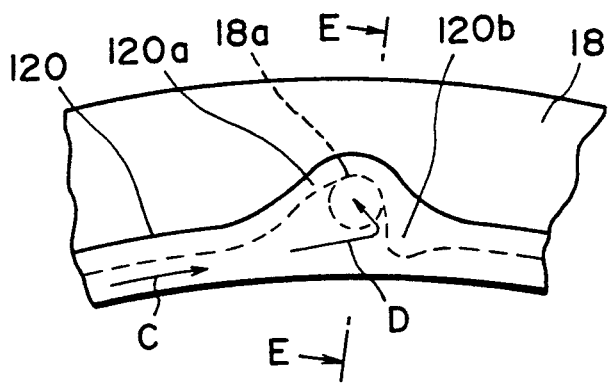
FIG. 25 is an enlarged view showing details of the embodiment of FIG. 24.
Figure 26:
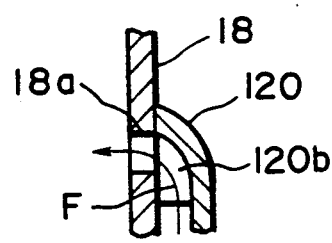
FIG. 26 is cross-sectional view taken along line E—E of FIG. 25.
Figure 28:
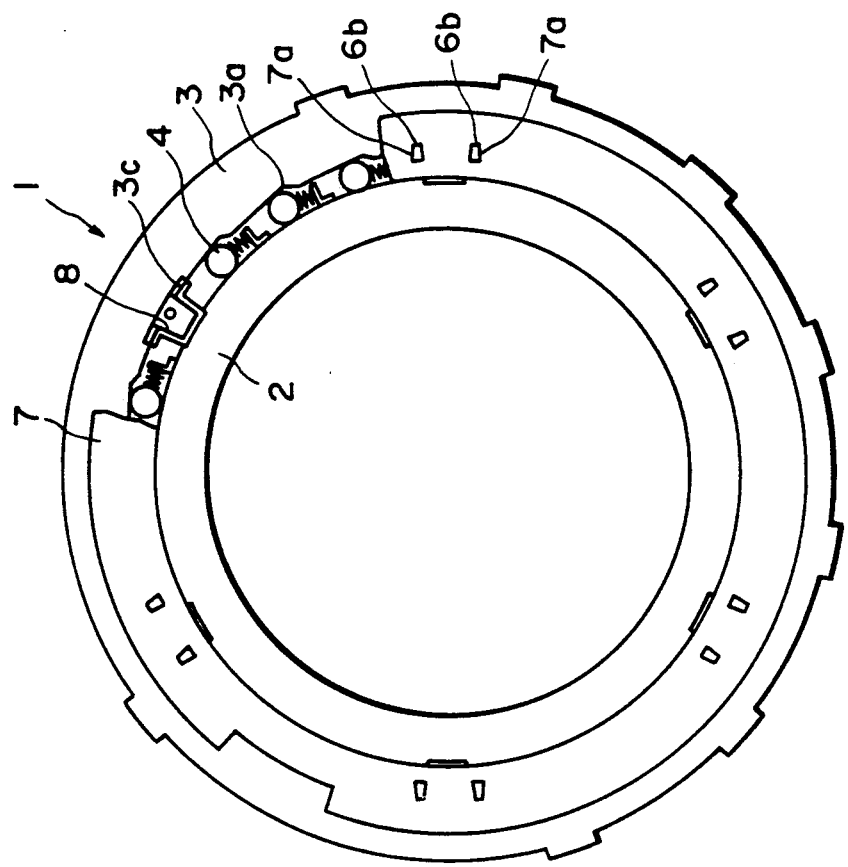
FIG. 28 is a front view, partly cut away, of the one-way clutch of FIG. 27.
Figure 29:
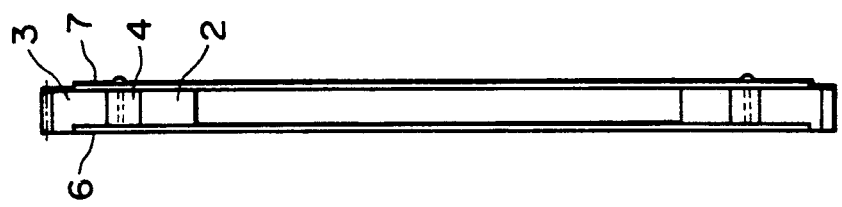
FIG. 29 is longitudinal cross-sectional view of the one-way clutch in FIG. 28.
Figure 27:
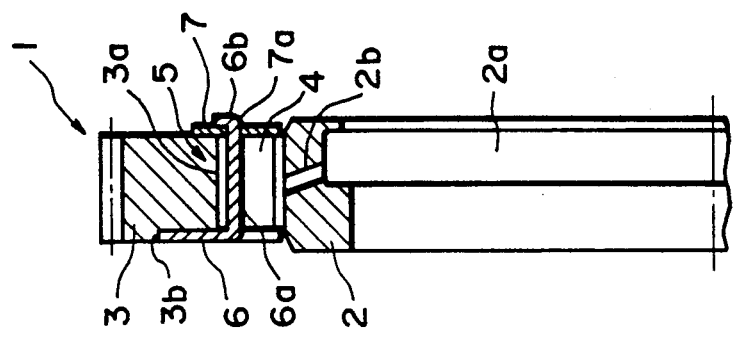
FIG. 27 is an enlarged fragmentary cross-sectional view of a conventional one-way clutch where a lubricating hole is provided through the inner ring.
Figure 30:
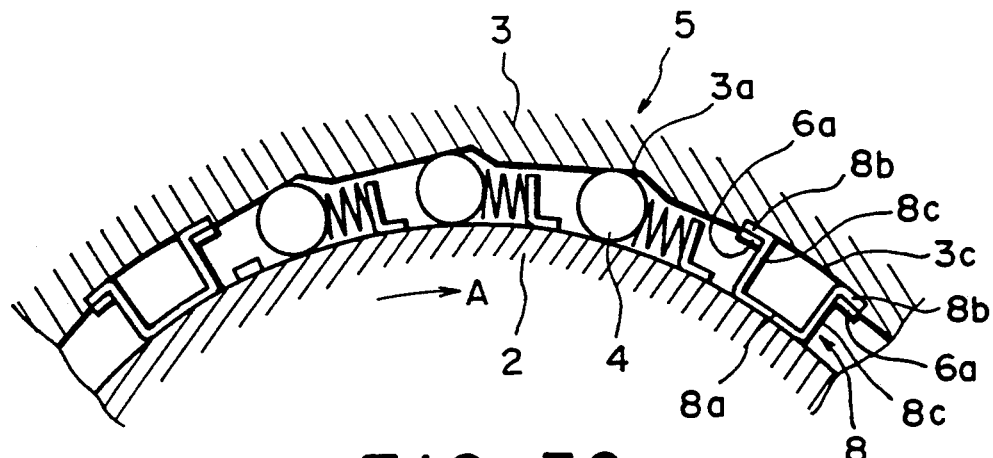
FIG. 30 shows details of the roller arrangement.
Figure 31:
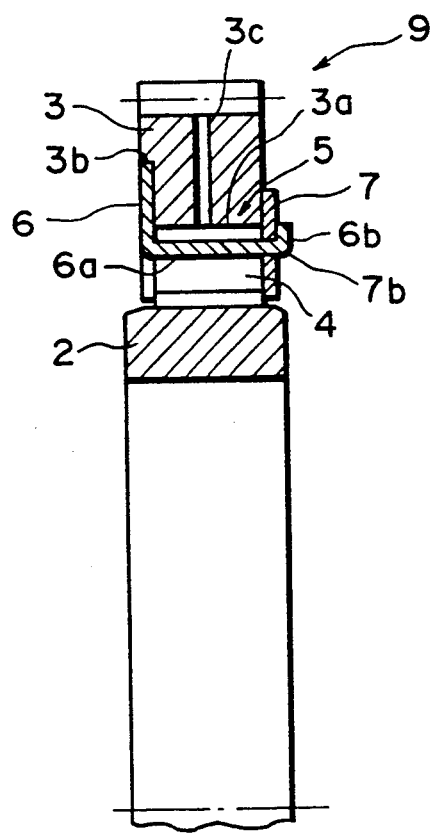
FIG. 31 is an enlarged fragmentary cross-sectional view of a conventional one-way clutch where a lubricating hole is provided in the outer ring.
Figure 32:
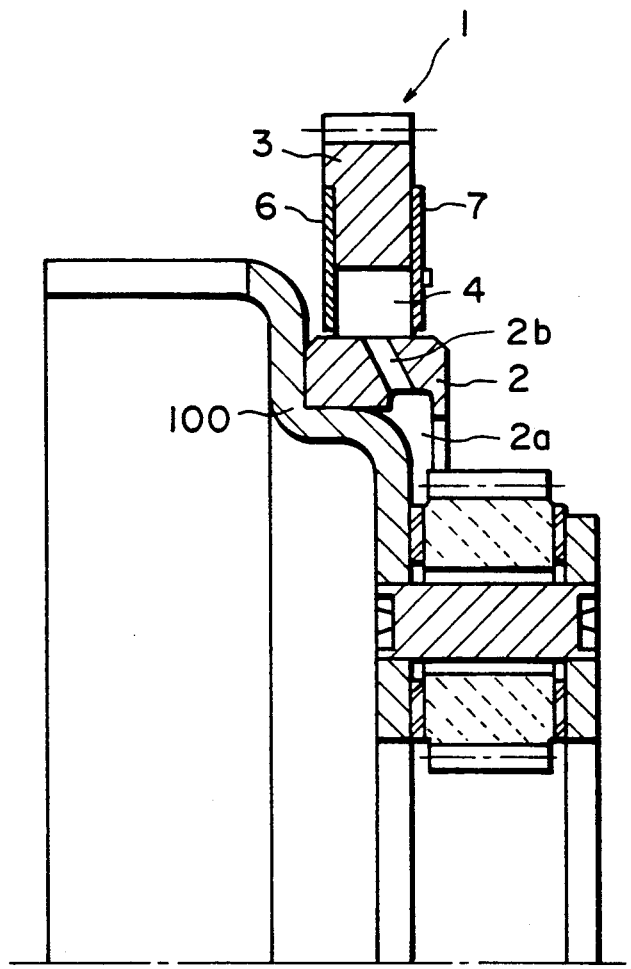
FIG. 32 shows a conventional application of a one-way clutch.

FIGS. 24 through 26 show a modification of oil catcher 20 of the third embodiment shown in FIG. 11. In FIG. 24, oil catcher 120 mounted on penetrating hole 18a of second side plate 18 has weir 120b provided in the vicinity of tubular projection 120a for leading lubricating oil to penetrating hole 18a. As oil catcher 120 receives lubricating oil flowing from the rotating elements around the one-way clutch, the received oil has momentum in a circumferential direction and rotates within the catcher 120 as shown by arrow C. Consequently, for leading the lubricating oil rotating within oil catcher 120 to penetrating hole a, weir 120b is provided behind penetrating hole 18a relative to the rotating direction of the lubricating oil so that as shown by arrow D, lubricating oil impinges on weir 120b and then flows easily into penetrating hole 18a. FIG. 26 is a cross-sectional view along line E—E in FIGS. 25. Lubricating oil impinges on weir 120b, as shown by arrow F, to flow into penetrating hole 18a.

The lubricating device of the one-way clutch of the present invention is, of course, not limited to the above-described embodiments, and various changes and modifications may be made without departing from the spirit and principles of the invention, as will be readily appreciated by those skilled in the art.

It will also be appreciated that because it is not necessary to provide a lubricating hole in the inner or outer ring in the present invention, it is possible to reduce the weight of the one-way clutch and to reduce the cost. Moreover, the invention allows the mounting position of the one-way clutch to be selected with a greater degree of freedom, being unrestricted by the location of such a lubricating hole.

The invention claimed is:

1. A one-way clutch comprising an inner ring having a track surface on an outer periphery thereof; an outer ring concentric with said inner ring and having a track surface on an inner periphery thereof; clutch members disposed between the track surface of said inner ring and the track surface of said outer ring and permitting relative rotation of said inner and outer rings in only one direction; at least one centering block disposed between the track surfaces of said inner and outer rings and between an adjacent pair of said clutch members to support and to maintain concentricity of said inner ring and said outer ring, said centering block having a sliding portion sliding on the track surface of one of said inner and outer rings and a pair of spaced radially extending supporting portions; a side plate attached to one of said inner and outer rings and covering corresponding end surfaces of said clutch members, said side plate having a hole therethrough in alignment with a space between said supporting portions of said centering block; and means for introducing lubricating oil into said space through said hole of said side plate.

2. A one-way clutch according to claim 1, wherein said introducing means comprises a pipe having an end portion received in said hole of said side plate.

3. A one-way clutch according to claim 1, wherein said introducing means comprises a pipe having an end connected to a tubular projection of said side plate.

4. A one-way clutch according to claim 1, wherein said introducing means comprises an oil catcher attached to said side plate and having a wall extending circumferentially of said side plate and outwardly along an axis of said side plate to define an oil catchment space for catching lubrication oil flowing outwardly in a radial direction by centrifugal force, said oil catcher further having means for directing the oil thus caught into said hole of said side plate.

5. A one-way clutch according to claim 4, wherein said directing means comprises a tubular member inserted in said hole of said side plate.

6. A one-way clutch according to claim 4, wherein said directing means comprises weir means configured for re-directing oil caught by said oil catcher and flowing circumferentially within said oil catcher into said hole of said side plate.

7. A one-way clutch comprising an inner ring having a track surface on an outer periphery thereof; an outer ring concentric with said inner ring and having a track surface on an inner periphery thereof; clutch members disposed between the track surface of said inner ring and the track surface of said outer ring and permitting relative rotation of said inner and outer rings in only one direction; and a side plate attached to said outer ring and covering corresponding end surfaces of said clutch members, said side plate being provided with means including an axially outwardly inner peripheral portion of said side plate catching lubricating oil flowing outwardly in a radial direction under centrifugal force and for directing the lubricating oil between the track surface said inner and outer rings.

8. A one-way clutch according to claim 7, wherein the entire inner periphery of said side plate is protruded as aforesaid.

9. A one-way clutch according to claim 7, wherein a plurality of circumferentially spaced inner peripheral portions of said side plate are protruded as aforesaid.

10. A one-way clutch comprising an inner ring having track surface on an outer periphery thereof; an outer ring concentric with said inner ring and having a track surface on an inner periphery thereof; clutch members disposed between the track surface of said inner ring and the track surface of said outer ring and permitting relative rotation of said inner and outer rings in only one direction; a side plate attached to one of said inner and outer rings and covering corresponding end surfaces of said clutch members, said side plate having at least one axially outwardly protruded and radially inwardly open embossment of substantially triangular shape for catching lubricating oil flowing outwardly in a radial direction under centrifugal force and directing the oil thus caught between the track surfaces of said inner and outer rings.

11. A one-way clutch comprising an inner ring having a track surface on an outer periphery thereof; an outer ring concentric with said inner ring and having a track surface on an inner periphery thereof; clutch members disposed between the track surface of said inner ring and the track surface of said outer ring and permitting relative rotation of said inner and outer rings in only one direction; a side plate attached to one of said inner and outer rings and covering corresponding end surfaces of said clutch members, said side plate having a hole therethrough in communication with a space between said track surfaces; and an oil catcher attached to said side plate and having a wall extending circumferentially of said side plate and outwardly along an axis of said side plate to define an oil catchment space for catching lubricating oil flowing outwardly in a radial direction under centrifugal force and to guide the lubricating oil into said hole of said side plate, said oil catcher including a tubular member inserted in said hole of said side plate.

12. A one-way clutch comprising an inner ring having a track surface on an outer periphery thereof; an outer ring concentric with said inner ring and having a track surface on an inner periphery thereof; clutch members disposed between the track surface of said inner ring and the track surface of said outer ring and permitting relative rotation of said inner and outer rings in only one direction; a side plate attached to one of said inner and outer rings and covering corresponding end surfaces of said clutch members, said side plate having a hole therethrough in communication with a space between said track surfaces; and an oil catcher attached to said side plate and having a wall extending circumferentially of said side plate and outwardly along an axis of said side plate to define an oil catchment space for catching lubricating oil flowing outwardly in a radial direction under centrifugal force and to guide the lubricating oil into said hole of said side plate, said oil catcher including weir means configured for redirecting oil flowing circumferentially within said oil catcher into said hole of said side plate.

* * * * *